(12) United States Patent
Asipov

(10) Patent No.: US 9,213,846 B2
(45) Date of Patent: *Dec. 15, 2015

(54) USING FLASH STORAGE DEVICE TO PREVENT UNAUTHORIZED USE OF SOFTWARE

(71) Applicant: Microsoft Corporation, Redmond, WA (US)

(72) Inventor: Boris Asipov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,325

(22) Filed: May 5, 2013

(65) Prior Publication Data
US 2013/0247229 A1    Sep. 19, 2013

Related U.S. Application Data

(63) Continuation of application No. 11/848,381, filed on Aug. 31, 2007, now Pat. No. 8,452,967.

(51) Int. Cl.
*H04L 9/32*    (2006.01)
*G06F 21/60*    (2013.01)
*G06F 21/10*    (2013.01)

(52) U.S. Cl.
CPC .............. *G06F 21/60* (2013.01); *G06F 21/10* (2013.01)

(58) Field of Classification Search
CPC ....... G06F 21/10; G06F 21/44; G06F 21/105; G06F 21/12; G06F 2221/2101; G06F 8/60; H04L 9/3247; H04L 63/105
USPC ........ 711/102, 103, 145; 726/27, 26; 713/176
See application file for complete search history.

(56) References Cited

U.S. PATENT DOCUMENTS 6,226,747 B1    5/2001 Larsson et al.
6,411,941 B1    6/2002 Mullor et al.
(Continued)

FOREIGN PATENT DOCUMENTS

KR    1020050111326 A    11/2005
WO    2007020545 A    2/2007
WO    2007069164 A    6/2007

OTHER PUBLICATIONS

"Security Made Solid with Non-Volatile NOVeA" retrieved at <<http://www.viragelogic.com/upload/documents/NOVeA_White_Paper.pdf>> pp. 8.

(Continued)

*Primary Examiner* — Brian Shaw
(74) *Attorney, Agent, or Firm* — Tim Churna; Judy Yee; Micky Minhas

(57) ABSTRACT

A flash storage device and a method for using the flash storage device to prevent unauthorized use of a software application are provided. An identifier may be encoded within specific sectors of the flash storage device. One bits of the identifier may be encoded as unusable ones of the specific sectors and zero bits of the identifier may be encoded as usable one of the specific sectors. Alternatively, the zero bits of the identifier may be encoded as the unusable ones of the specific sectors and the one bits of the identifier may be encoded as the usable ones of the specific sectors. The software application may be permitted to execute on a processing device connected to the flash storage device only when the identifier is encoded within the flash storage device.

20 Claims, 12 Drawing Sheets

(56) References Cited

U.S. PATENT DOCUMENTS

| | | |
|---|---|---|
| 7,114,047 B2 | 9/2006 | Iwasaki |
| 7,137,012 B1 | 11/2006 | Kamibayashi et al. |
| 2004/0015709 A1 | 1/2004 | Chen et al. |
| 2005/0108556 A1* | 5/2005 | DeMello et al. ............. 713/189 |
| 2005/0193161 A1* | 9/2005 | Lee et al. ..................... 711/103 |
| 2005/0268098 A1 | 12/2005 | Oh et al. |
| 2006/0059194 A1 | 3/2006 | Oh et al. |
| 2006/0080260 A1 | 4/2006 | Chen et al. |
| 2006/0168580 A1 | 7/2006 | Harada et al. |
| 2006/0200414 A1 | 9/2006 | Roberts |
| 2007/0061597 A1 | 3/2007 | Holtzman et al. |
| 2007/0074050 A1 | 3/2007 | Camiel |
| 2007/0118766 A1 | 5/2007 | Li Fo Sjoe |
| 2007/0150963 A1 | 6/2007 | Lee et al. |
| 2007/0162982 A1 | 7/2007 | Staring et al. |

OTHER PUBLICATIONS

International Search Report and Written Opinion Received for PCT Application No. PCT/US2008/072118, mailed on Feb. 23, 2009, 10 pages.

Lotspiech, "Content Protection for Recordable Media (CPRM) Proposal", IBM Corporation, Dec. 6, 2000, pp. 1-8.

Extended European Search Report; EP App. No. 08797125.5; mailed May 7, 2013; 7 pages.

Office Action dated May 18, 2011 in CN Pat. App. No. 200880105079.7, 9 pages, including translation.

"Notice of Allowance Issued in Korean Patent Application No. 10-2010-7004113", Mailed Date: Jan. 20, 2015, 3 Pages. (W/O English Translation).

* cited by examiner

| SECTOR ARRAY OF BAD SECTORS 302 |
|---|
| LICENSE INFORMATION 304 |
| SECTOR ARRAY FOR ENCODED INFORMATION 306 |

| SECTOR ARRAY FOR IDENTIFIER 402 |
|---|
| SECTOR ARRAY FOR DIGITAL SIGNATURE OF IDENTIFIER 404 |
| SECTOR ARRAY FOR USE WITH COUNTERS 406 |
| SECTOR ARRAY FOR TIME PERIOD COUNTERS 408 |

FIG. 4

USING FLASH STORAGE DEVICE TO PREVENT UNAUTHORIZED USE OF SOFTWARE

CROSS-REFERENCE TO RELATED APPLICATION(S)

This application is a continuation application of U.S. patent application Ser. No. 11/848,381, filed on Aug. 31, 2007, and entitled "USING FLASH STORAGE DEVICE TO PREVENT UNAUTHORIZED USE OF SOFTWARE" now U.S. Pat. No. 8,452,967, issued May 28, 2013. The afore-referenced application is hereby incorporated by reference.

BACKGROUND

One conventional method for preventing unauthorized use of software on a processing device is to require a special device, such as, for example, a Universal Serial Bus (USB) dongle or memory key, to be connected to the processing device. The software may be permitted to execute on the processing device only when the special device is connected to the processing device.

Typically, such a special device is manufactured by only a few vendors, has a relatively high cost, and should be distributed with the software. Further, use of such a special device to prevent unauthorized use of software is problematic with respect to electronically distributed software.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a flash storage device for preventing unauthorized use of software and a method for using a flash storage device to prevent unauthorized use of software are provided. When attempting to execute software on a processing device having the flash storage device connected therewith, the processing device may access license information, which may include an identifier. Specific sectors of the flash storage device may then be accessed to determine whether the identifier is encoded therein. One bits of the identifier may be encoded as unusable ones of the specific sectors and zero bits of the identifier may be encoded as usable one of the specific sectors. Alternatively, the zero bits of the identifier may be encoded as the unusable ones of the specific sectors and the one bits of the identifier may be encoded as the usable ones of the specific sectors. The processing device may be permitted to execute the software with full functionality only when the identifier is determined to be encoded within the flash storage device. Otherwise, the processing device may not be permitted to execute the software, or may execute the software with limited functionality.

In some embodiments consistent with the subject matter of this disclosure, counters may be encoded within the flash storage device in order to determine whether license terms, such as, for example, a predetermined number of authorized uses of the software, or an expiration date of the software, as well as other license terms, are not exceeded.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIGS. 3 and 4 illustrate information which may be included in a flash storage device consistent with the subject matter of this disclosure.

DETAILED DESCRIPTION

Figure 1:
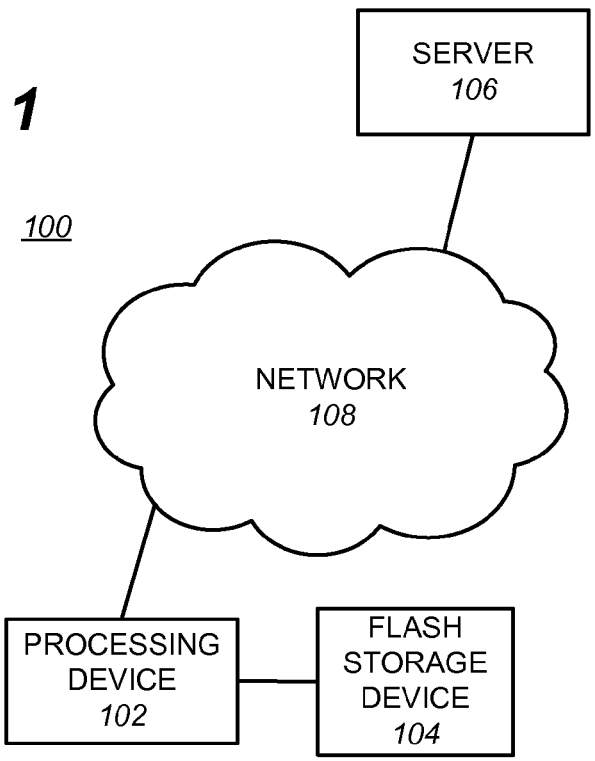
FIG. 1 illustrates an exemplary operating environment for embodiments consistent with the subject matter of this disclosure.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Overview

Flash storage devices can be easily duplicated and do not have an embedded processor or protected memory. However, the flash storage devices include blocks of memory, or sectors, of a specific size, such as, for example, 16 kilobits, 2 kilobits, or another size. Each respective one of the sectors has a limited number of possible write cycles before the respective one of the sectors becomes unusable. Typically, each respective one of the sectors may be written to approximately one million times before the respective one of the sector becomes unusable. Some flash storage devices may have a different limited number of possible write cycles before respective sectors become unusable, such as, 100,000 writes, or another value.

Embodiments consistent with the subject matter of this disclosure may encode information in a flash storage device by writing to specific sectors of the flash storage device to make the specific sectors unusable. The information may be encoded by representing one bits via unusable sectors and representing zero bits via usable sectors. In some embodiments, the information may be encoded by representing zero bits via unusable sectors and representing one bits via usable sectors. Data encoded in this manner may not be duplicated by simply copying the flash storage device.

In various embodiments consistent with the subject matter of this disclosure, a processing device connected to a flash storage device may access license information, which may include an identifier. The processing device may access specific sectors of the flash storage device to determine whether the identifier is encoded therein. If the identifier is not encoded within the flash storage device, the processing device may not execute a software application, or may execute the software application with only a limited functionality.

Further, the license information may include information with respect to one or more terms of the license. For example, the information may include an expiration date, a license term (for example, one year, six months, or other time), or a predetermined number of authorized uses, beyond which the software application may not be permitted to execute or may execute with only limited functionality. As will be explained below in more detail, a current status with respect to passed time periods, or a number of uses of a software application may be encoded into the flash storage device in a same manner as the identifier, such that unauthorized execution of the software application beyond the one or more terms of the license may be prevented.

In some embodiments, the identifier may be encoded into the flash storage device while performing activation of the software application.

Exemplary Operating Environment

FIG. 1 illustrates an exemplary operating environment 100 for embodiments consistent with the subject matter of this disclosure. Operating environment 100 may include a processing device 102, a flash storage device 104, one or more servers 106, and a network 108.

Network 108 may be a single network or a combination of networks, such as, for example, the Internet or other networks. Network 108 may include a wireless network, a wired network, a packet-switching network, a public switched telecommunications network, a fiber-optic network, other types of networks, or any combination of the above.

Processing device 102 may be a user's processing device, such as, for example, a desktop personal computer (PC), a laptop PC, a handheld processing device, or other processing device.

Flash storage device 104 may be a rewritable removable flash storage device, such as, for example, a universal serial bus (USB) flash RAM device, or other flash storage device, which may be removably connected to processing device 102. In embodiments in which flash storage device 104 is a USB flash RAM device, the USB flash RAM device may be removably connected to processing device 102 via a USB port of processing device 102.

Server 106 may be a processing device or a group of processing devices configured to work together. In embodiments in which server 106 includes a group of processing devices, the processing devices may be configured as a server farm.

Exemplary Processing Device

Figure 2:
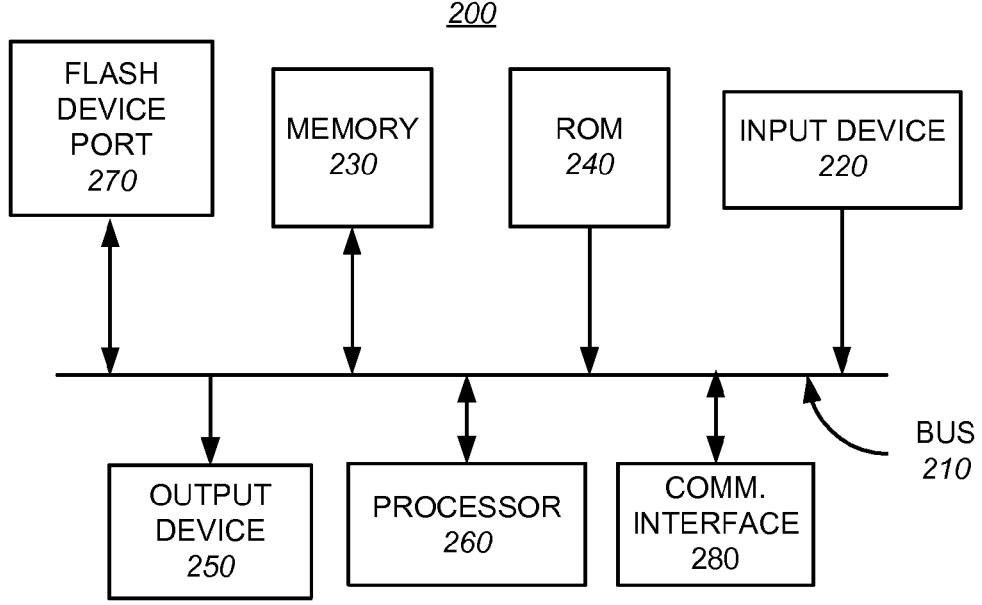
FIG. 2 is a functional block diagram of a processing device, which may be used to implement a server or a processing device shown in FIG. 1.

FIG. 2 is a functional block diagram that illustrates an exemplary processing device 200, which may be used to implement embodiments of processing device 102 and/or server 106 consistent with the subject matter of this disclosure.

Processing device 200 may include a bus 210, an input device 220, a memory 230, a read only memory (ROM) 240, an output device 250, a processor 260, a flash device port 270, and a communication interface 280. Bus 210 may permit communication among components of processing device 200.

Processor 260 may include at least one conventional processor or microprocessor that interprets and executes instructions. Memory 230 may be a random access memory (RAM) or another type of dynamic storage device that stores information and instructions for execution by processor 260. Memory 230 may also store temporary variables or other intermediate information used during execution of instructions by processor 260. ROM 240 may include a conventional ROM device or another type of static storage device that stores static information and instructions for processor 260. Flash device port 270 may provide a means for connecting flash storage device 104, to processing device 200. Flash storage device 104 may store data and/or instructions for a processor, such as, for example, processor 260.

Input device 220 may include a keyboard or other input device. Output device 250 may include one or more conventional mechanisms that output information, including one or more display screens, or other output devices.

Communication interface 280 may include a transceiver for transmitting and receiving information to or from network 108. Communication interface 280 may transmit and receive information via a wireless or wired connection.

Processing device 200 may perform such functions in response to processor 260 executing sequences of instructions contained in a tangible machine-readable medium, such as, for example, memory 230, ROM 240, flash storage device 104, or other medium. Such instructions may be read into memory 230 from another machine-readable medium or from a separate device via communication interface 280.

Flash Storage Device

Flash storage device 104 may include a number of blocks or sectors. Each of the sectors may include a predetermined number of bits. For example, each of the sectors may include 16 kilobits, 2 kilobits, or another number of bits. Typically, flash storage device 104 may initially have a number of unusable sectors. FIG. 3 illustrates information with respect to sectors, as well as other information, which may be included in an embodiment of flash storage device 104. Flash storage device 104 may include a sector array of bad sectors 302, license information 304, and a sector array for encoded information 306.

Sector array of bad sectors 302 may include information with respect to physical addresses of bad sectors included in flash storage device 104.

License information 304 may include information with respect to a license for using a software application. License information 304 may include, for example, a product identifier to identify a product including the software application, and license terms. The license terms may include conditions under which execution of the software application is permitted. For example, the license terms may include a predetermined number of permitted executions of the software application, a term or time period during which execution of the software application is permitted (for example, one year, six months, or another time period), an expiration date after which execution of the software application is not permitted, or other terms. In some embodiments, license information 304 may include an identifier to be encoded in flash storage device 104. License information 304 may also include a digital signature calculated over license information 304 using a private key of a trusted source, such as, for example, a software vendor, a software distributor, or other trusted source.

As previously mentioned, an identifier, such as the identifier included in license information 304, or another identifier, as well as other information, may be encoded within specific sectors of flash storage device 104. The identifier and the other information may be encoded by representing one bits via unusable ones of the specific sectors and representing zero bits via usable ones of the specific sectors. In some embodiments, the identifier and the other information may be encoded by representing zero bits via unusable ones of the sectors and representing one bits via usable ones of the sectors.

FIG. 4 illustrates sector array of encoded information 306 in more detail in one embodiment of flash storage device 104 consistent with the subject matter of this disclosure. Flash storage device 104 may include a sector array for an identifier 402, a sector array for a digital signature with respect to the identifier 404, a sector array for use with counters 406, and a sector array for time period counters 408.

Sector array for an identifier 402 may include information with respect to specific sectors in which an identifier, such as, for example, an identifier from license information 304, or another identifier, may be encoded. Sector array for digital signature of identifier 404 may include information with respect to specific sectors in which a digital signature, calculated over the identifier, may be encoded. The digital signature may be calculated over the identifier using a private key, such as, for example, the private key of the trusted source. Sector array for use with counters 406 and sector array for time period counters 408 may include information with respect to specific sectors for encoding counters, such that a current status with respect to license terms may be tracked. Exemplary use of these counters is explained below with reference to flowcharts of FIGS. 5-10.

Exemplary Processing

Figure 5:
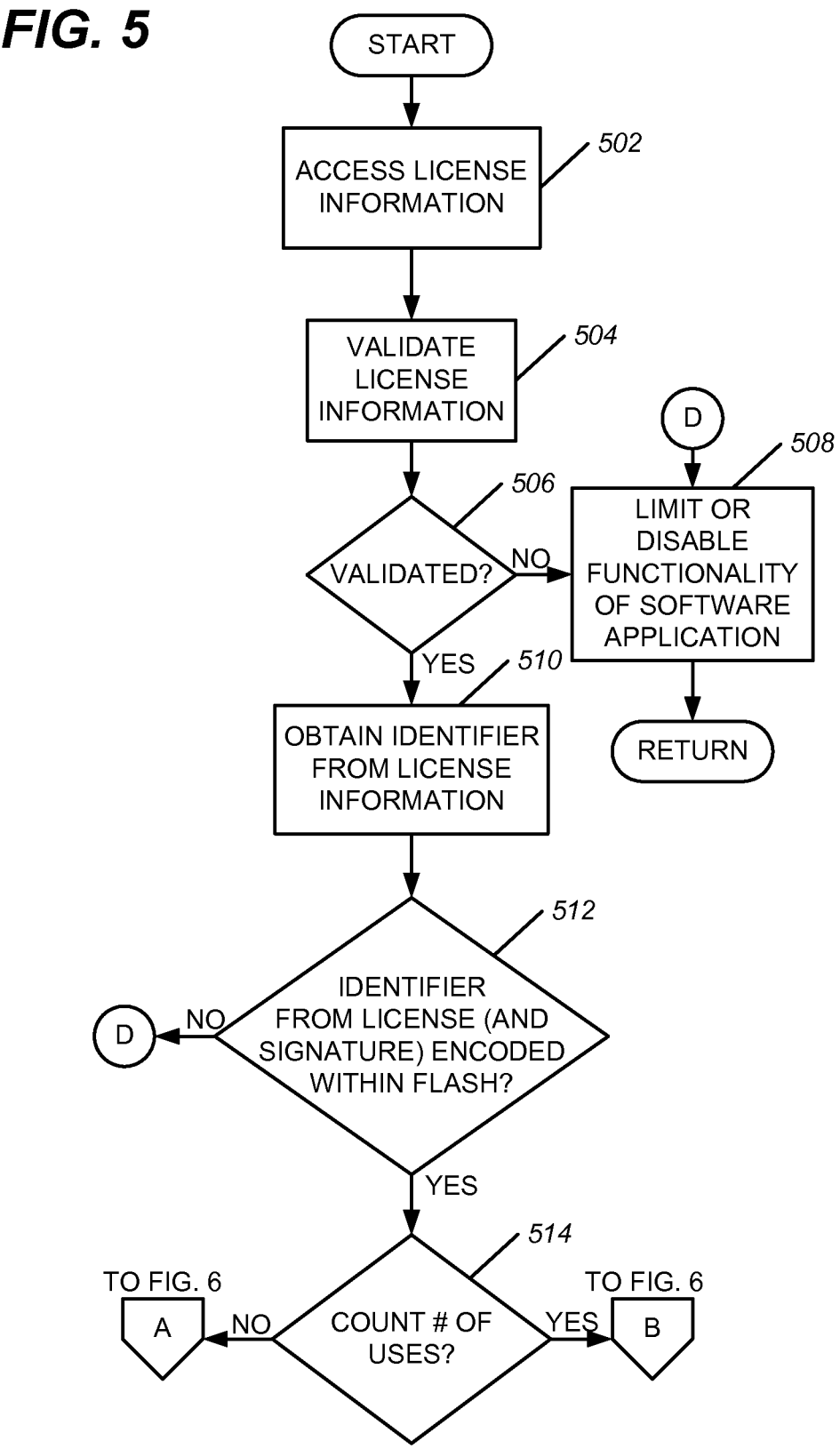
FIGS. 5-14 are flowcharts illustrating exemplary processes which may be performed in embodiments consistent with the subject matter of this disclosure.
Figure 6:
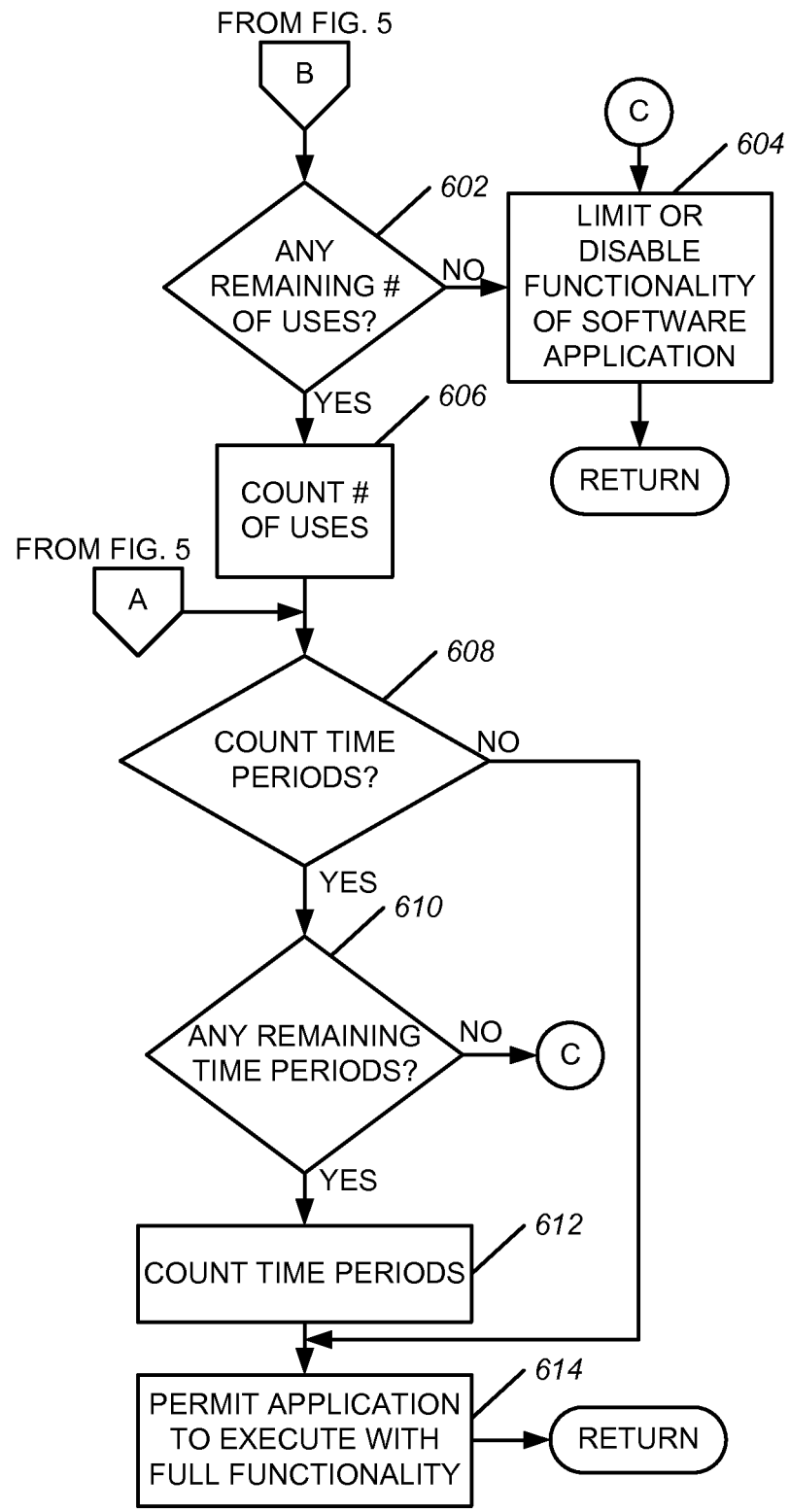

FIGS. 5 and 6 illustrate flowcharts of an exemplary process, which may be performed in embodiments consistent with the subject matter of this disclosure, when an attempt is made to execute a software application on a processing device, such as, for example, processing device 102, having a flash storage device, such as, for example, flash storage device 104, connected therewith.

The process may begin with the processing device accessing license information (act 502). The license information may be stored on a component of the processing device, such as, for example, a memory, ROM, or other component. Alternatively, the license information and may be stored in the flash storage device, such as, for example, license information 304. The license information may include data identifying a product including the software application, an identifier (for example, an identifier associated with a license to use the product), license terms (for example, a predetermined number of uses of the software application, a time period during which the software application may be used, such as, for example, one year, six months, or other time period, or an expiration date after which the software application may not be used), or other terms. In some embodiments, the license information may include a digital signature, signed by a private key, such as, for example, a private key of a trusted source, such as, for example, a software distributor, a software developer, or other trusted source.

Next, the processing device may validate the license information (act 504). In some embodiments, the processing device may validate license information by using a public key corresponding to the private key of the trusted source. The processing device may then determine whether the license information is valid, as indicated by a result of the validating of the license information (act 506). If the license information is determined to be invalid, then the processing device may limit or disable functionality of the software application (act 508). For example, the processing device may not be permitted to execute the software application, or the processing device may execute the software application with a limited functionality. In one embodiment, when the functionality of the software application is limited, the processing device may execute a standard version of the software application, and when the functionality of the software application is not limited or disabled, the processing device may execute an enhanced, or professional, version of the software application.

If, during act 506, the processing device determines that the license information is valid, the processing device may obtain an identifier from the license information, or another source (act 510). In some embodiments, the identifier may be a unique identifier. The processing device may then determine whether the identifier, and a digital signature with respect to the identifier, are encoded within the flash storage device (act 512). The processing device may make this determination by referring to a sector array for the identifier, such as, for example sector array for identifier 402 (FIG. 4), and a sector array for the digital signature of the identifier, such as, for example, sector array for digital signature of identifier 404 (FIG. 4).

In an alternative embodiment, the digital signature of the identifier may not be encoded, but may instead be stored in storage of the flash storage device.

If the processing device determines that either the identifier is not encoded within the flash storage device, or a valid digital signature of the identifier is not encoded or stored in the flash storage device, then the processing device may limit or disable functionality of the software application (act 508), as discussed previously. Otherwise, the processing device may determine whether a number of uses of the software application is counted (act 514).

The number of uses of the software application may be counted when a license term indicates that only a predetermined number of uses of the software application may be permitted. In one embodiment, if the number of uses is to be counted, then a single sector may be used as a counter and a number of writes to the single sector may be performed. The number of writes may be calculated approximately as:

$$\text{number\_of\_writes} \approx \frac{\text{max\_writes}}{\text{counting\_number}} \times (\text{margin} + 1), \quad \text{(equation 1)}$$

where max_writes is a number of write cycles which are expected to make a sector unusable, and counting_number is a maximum value of a counter, such as, for example, 10, when counting to 10. Because a sector may not become unusable after an exact number of writes, a margin may be included to better guarantee that the sector becomes unusable. Thus, for example, if a sector is expected to become unusable after 100,000 writes (max_writes), the counter is used to count to 10 (counting_number), and margin is 30%, then number_of_writes may be $$\frac{100,000}{10} \times (.3 + 1),$$

which is 13,000. Thus, in this example, the counter may be incremented by writing to the single sector 13,000 times. After counting up to counting_number, the sector should be unusable.

In another embodiment, a group of sectors may be used for counting. For example, when counting to 10, a group of 10 sectors may be used as a counter. Each respective sector may be made unusable when counting. When the group of 10 sectors becomes unusable, this indicates that the counter has counted to 10.

If, during act 514, the processing device determines that the number of uses of the software application is to be counted, then the processing device may determine whether there are any remaining permitted uses (act 602; FIG. 6). If there are no remaining permitted uses of the software application, then the processing device may limit or disable functionality of the software application (act 604), as previously discussed with respect to act 508. Otherwise, the processing device may count the number of uses (act 606). As previously discussed, the processing device may count the number of uses by writing to respective sectors to make the respective sectors unusable, or by performing a number of writes to a single sector, such that the single sector becomes unusable after counting a predetermined number of uses.

Figure 7:
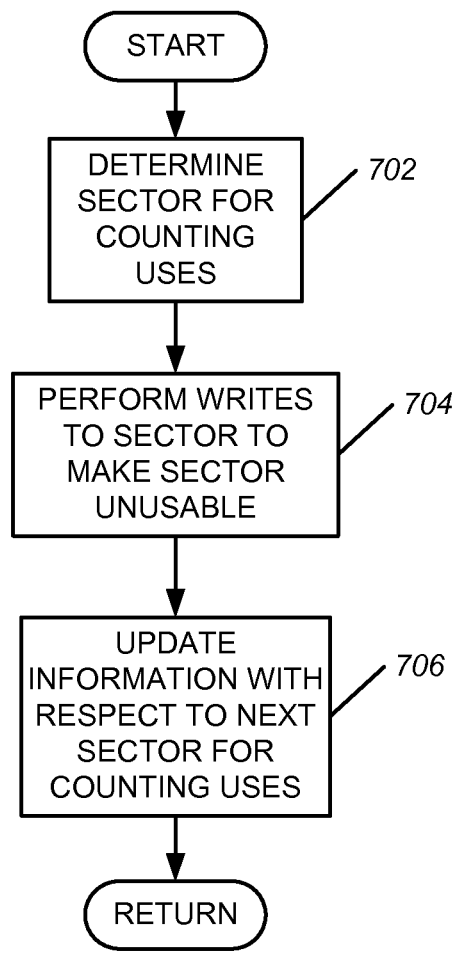

FIG. 7 is a flowchart illustrating an exemplary process 606-1 for performing act 606. The process may begin with the processing device determining which sector to use for counting the number of uses (act 702). In one embodiment, the processing device may access sector array for use with counters 406 (FIG. 4), which may include information with respect to sectors reserved for use counters and a pointer to a sector for a next use counter. Thus, for example, if sectors 1-20 are to be used for use counters and sectors 1-6 have already been used for counting and made unusable, then the pointer may point to sector 7 to use for counting purposes.

After determining a sector to use for counting uses, the processing device may perform multiple writes to the sector in order to make the sector unusable (act 704). The processing device may then update information with respect to a pointer to a sector for the next use counter (act 706). With respect to the example above, in which sectors 1-20 may be used for use counters, after using sector 7 for counting purposes, the pointer may be set to point to sector 8, such that sector 8 may be made unusable when counting is to be performed next.

Figure 8:
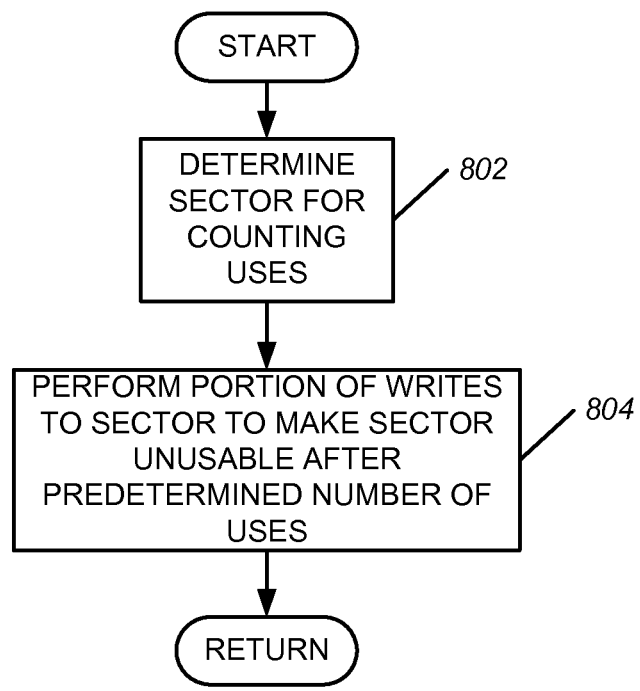

FIG. 8 is a flowchart illustrating a second exemplary process 606-2 for performing act 606. This exemplary process uses a single sector as a counter and performs counting according to equation 1, discussed previously. The process may begin with the processing device determining a sector to use for counting purposes (act 802). In one embodiment, the processing device may access sector array for use with counters 406 (FIG. 4), which may include information with respect to a sector reserved to be used as a use counter. The processing device may also obtain information with respect to a number of writes to perform with respect to the sector. The information may be included in a sector array for use with counters 406 or may be stored elsewhere. The processing device may then perform the number of writes to the sector, such that the sector becomes unusable after the predetermined number of uses has been counted (acts 804).

Returning to FIG. 6, after performing act 606 or after determining that the number of uses of the software application is not to be counted (act 514), the processing device may determine whether time periods are to be counted (act 608). In one embodiment, the processing device may make this determination by accessing sector array for time period counters 408 (FIG. 4), which may include information with respect to sectors of the flash storage device to be used as time period counters. Typically, a time period counter may count a number of time periods, such as, for example, days, weeks, months, years, or other time periods. Thus, for example, if a software application may be used for a particular time period, such as, for example, 18 months, a time period counter may be used to count a number of months. If the processing device determines that time period counters are not used, then the processing device may execute the software application with full functionality (act 614).

If, during act 608, the processing device determines that a time period counter is used, then the processing device may determine whether a maximum number of time periods, with respect to the license information, has been counted (act 610), such as, for example, 18 months, in the case of an 18 month license term. If there are no remaining time periods (for example, 18 months have passed with respect to an 18 month license term), then the processing device may limit or disable functionality of the software application (act 604), as previously discussed. Otherwise, the time period may be counted (act 612) and the processing device may execute the software application with full functionality.

In one embodiment, time periods may be counted by writing to respective sectors to make the respective sectors unusable. For example, to count 18 time periods, 18 sectors may be written to until the sectors are unusable. In other embodiments, a single sector may be written to, such that the single sector may become unusable after the passing of a predetermined number of time periods, such as, for example, 18 time periods, or some other number of time periods, as described above with respect to equation 1.

Figure 9:
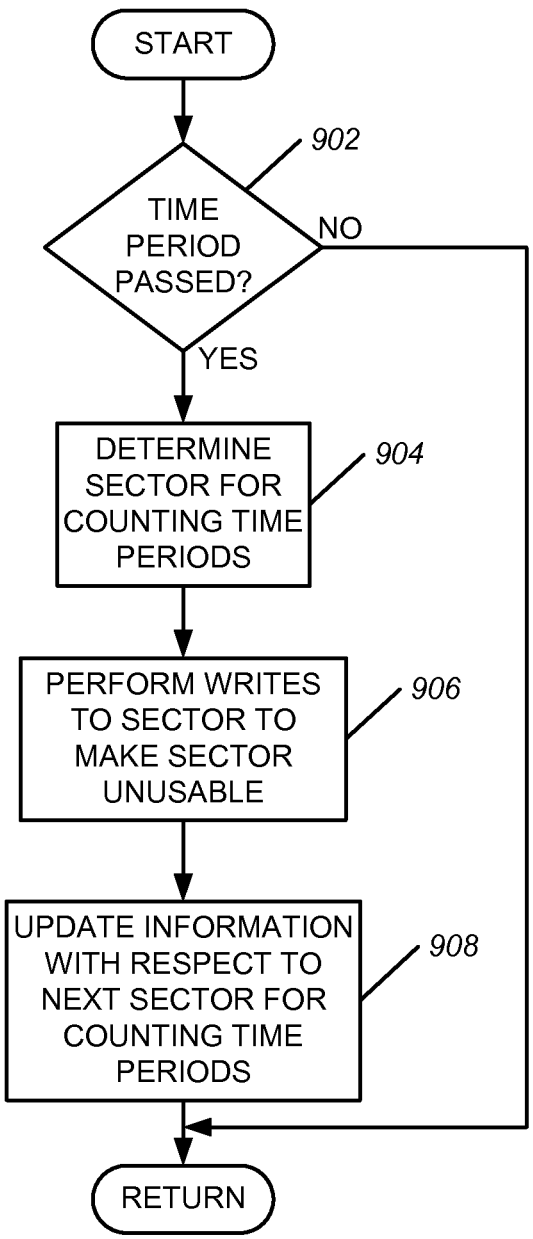

FIG. 9 is a flowchart illustrating an exemplary process 612-1 for performing act 612 in an embodiment consistent with the subject matter of this disclosure. The process may begin with the processing device determining whether a time period has passed (act 902). The time period may be days, weeks, months, years, or another time interval. The processing device may make this determination by referring to a system clock and comparing a current value of the system clock to value of the system clock at a beginning of the time period.

If the processing device determines that the time period has passed, then the processing device may determine a sector to use for counting time periods (act 904). In one embodiment, the processing device may access sector array for time period counters 408 (FIG. 4), which may include information with respect to sectors reserved for time period counters and a pointer to a sector for a next time period counter. Thus, for example, if sectors 1-24 are to be used for time period counters and sectors 1-10 have already been used for counting and made unusable, then the pointer may point to sector 11 to use for time period counting purposes.

After determining the sector to use for time period counting, the processing device may perform multiple writes to the sector in order to make the sector unusable (act 906). The processing device may then update information with respect to the pointer to a sector for a next time period counter (act 908). With respect to the example above, in which sectors 1-24 may be used as time period counters, after using sector 10 for time period counting, the pointer may be set to point to sector 11, such that sector 11 may be made unusable when time period counting is to be performed next.

Figure 10:
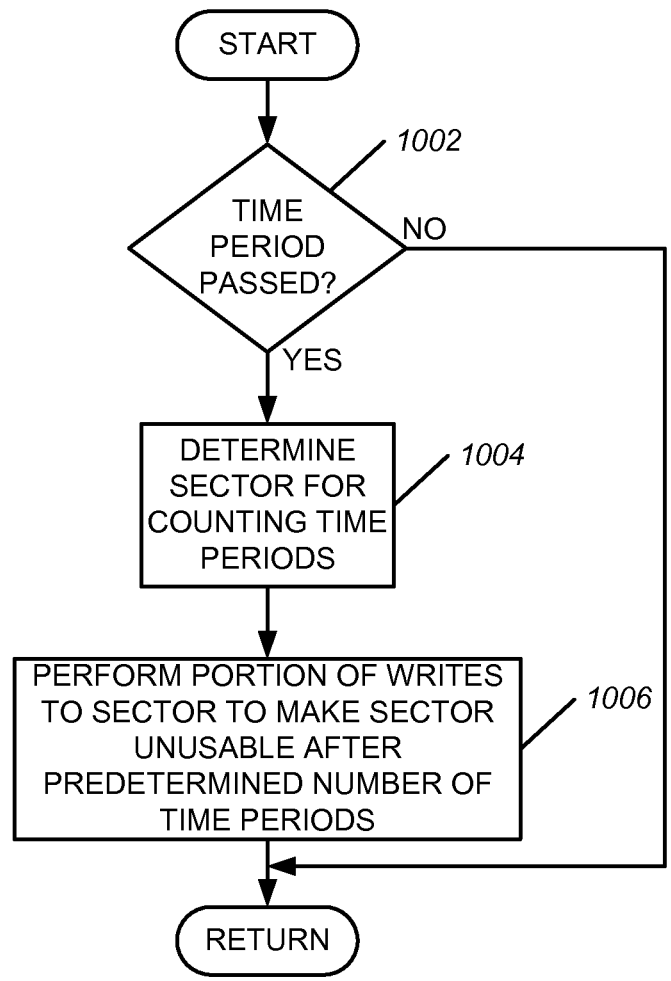

FIG. 10 is a flowchart illustrating a second exemplary process 612-2 for performing act 612. This exemplary process uses a single sector as a time period counter and may perform counting according to equation 1, discussed previously. The process may begin with the processing device determining whether a time period has passed (act 1002). If the processing device determines that a time period has passed, then the processing device may determine a sector to use for time period counting purposes (act 1004). In one embodiment, the processing device may access sector array for time period counters 408 (FIG. 4), which may include information with respect to a sector reserved to be used as a time period counter. The processing device may also obtain information with respect to a number of writes to perform with respect to the sector. The information may be included in sector array for time period counters 408 or may be stored elsewhere. The processing device may then perform the number of writes to the sector, such that the sector becomes unusable after the predetermined number of time periods has been counted (act 1006).

Returning to FIG. 6, the processing device may then execute the software application with full functionality (act 614).

In some embodiments, after installing a software application on a processing device, the processing device may be permitted to execute the software application up to a predetermined number of times without having a flash storage device for authorizing or permitting execution of the software application. Thus, for example, a user may electronically download a software application to a processing device, may install the software application on the processing device, and may execute the software application up to the predetermined number of times without having the flash storage device.

Figure 11:
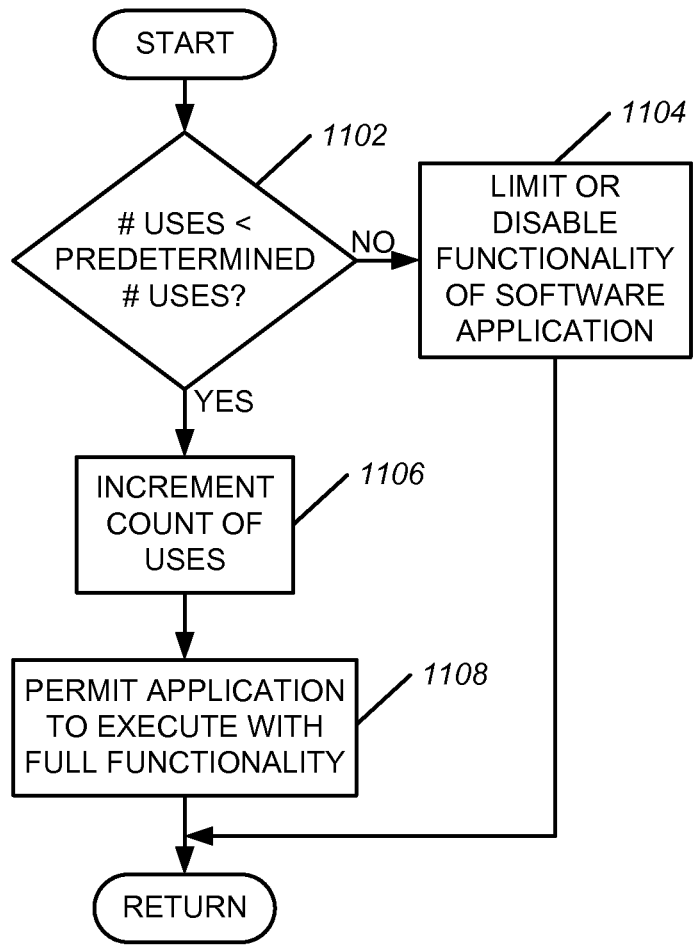

FIG. 11 illustrates an exemplary process, which may be performed in such embodiments. The process may begin with the processing device determining whether a current number of uses of the software application is less than a number of predetermined authorized uses of the software application (act 1102). The number of predetermined authorized uses may be obtained from accessing the license information, which may be stored on the processing device.

If the current number of uses of the software application is not less than the number of predetermined authorized uses, then functionality of the software application may be disabled or limited (act 1104). For example, the processing device may not execute the software application at all, or the processing device may execute the software application with only limited functionality.

If, during act 1102, the processing device determines that the current number of uses is less than the number of predetermined authorized uses, then the processing device may increment a count of the current number of uses (act 1106) and may permit the software application to execute with full functionality (act 1108).

Figure 12:
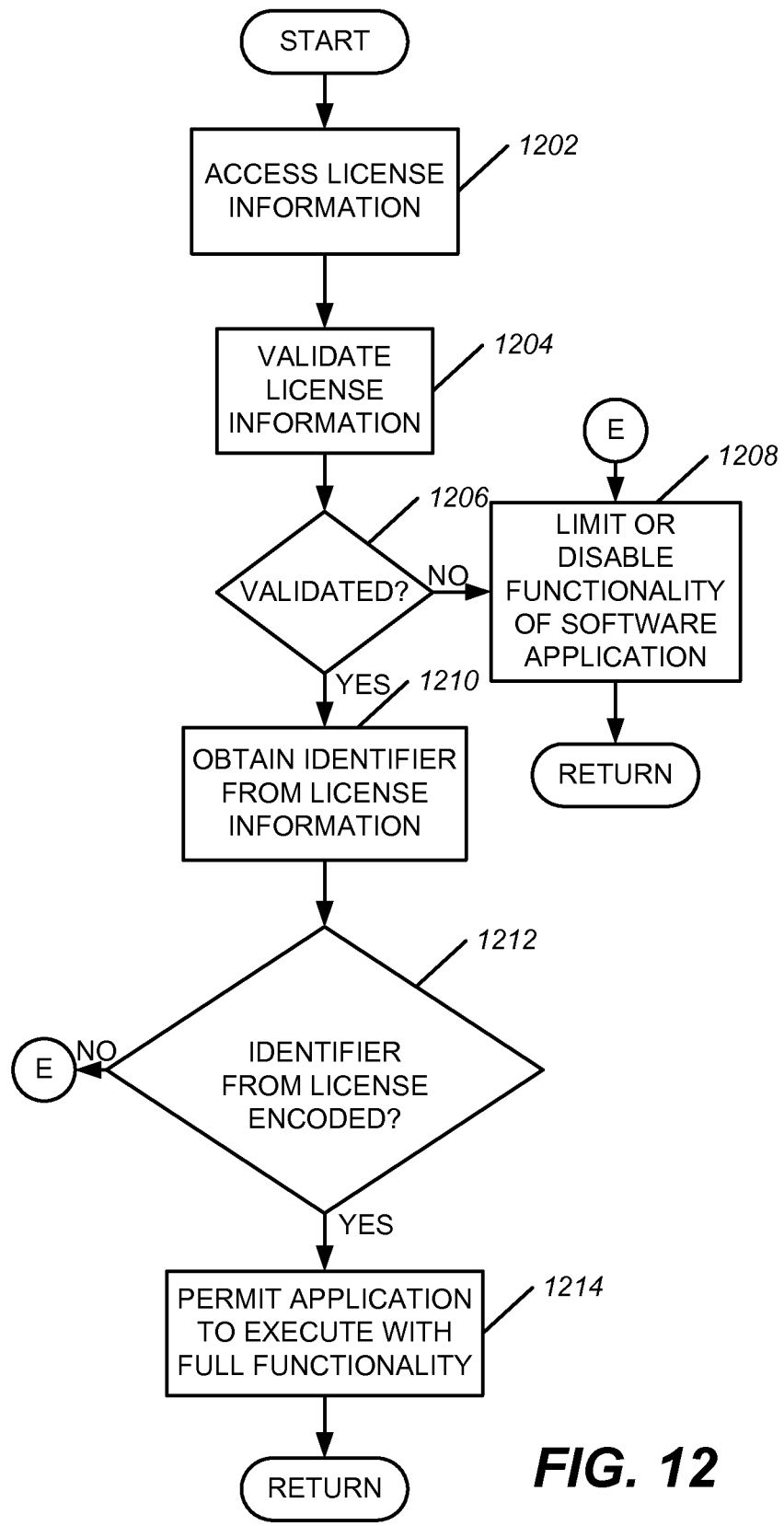
Figure 13:
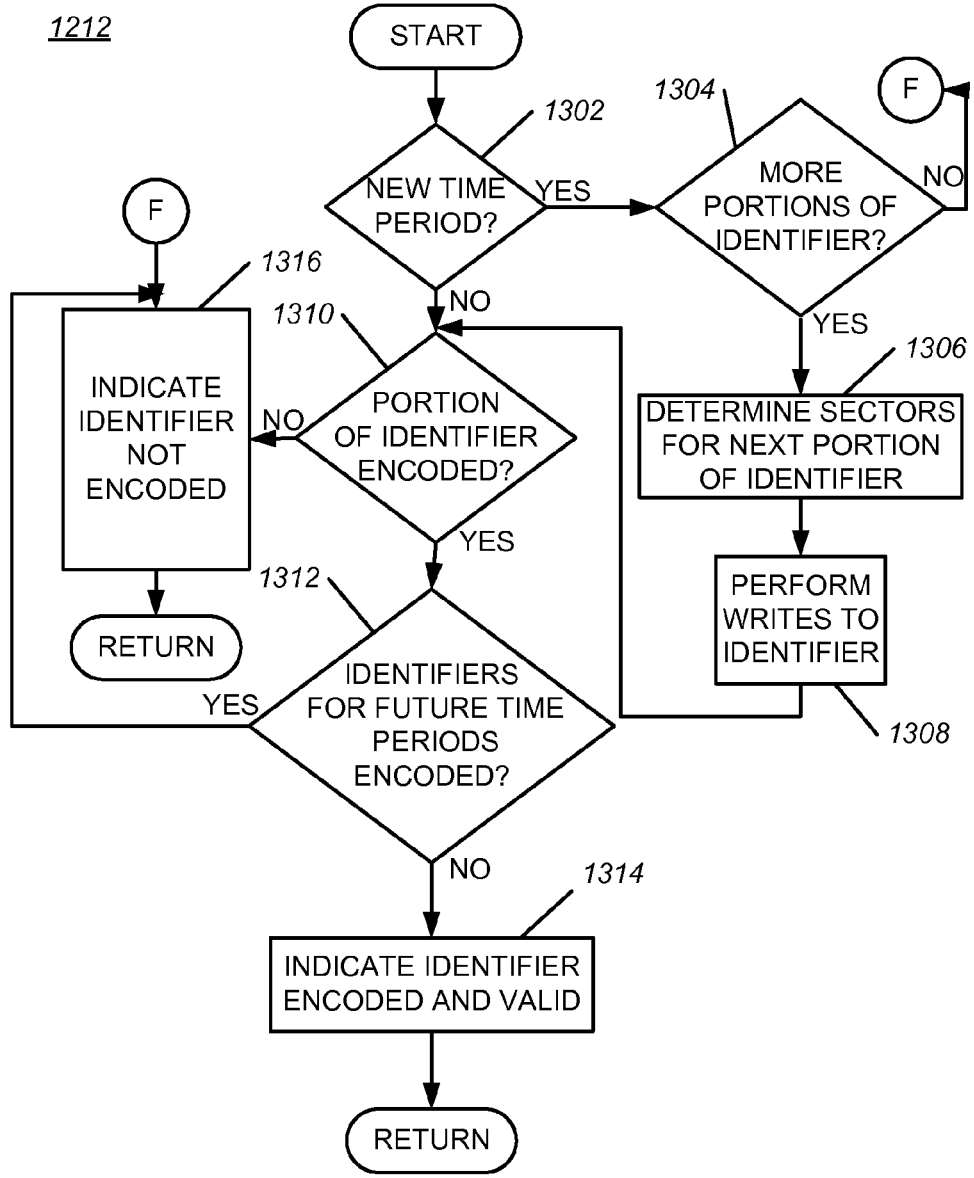

FIGS. 12-13 are flowcharts illustrating an exemplary process which may be performed in another embodiment consistent with the subject matter of this disclosure. In this embodiment, an identifier may be partially encoded into sectors of a flash storage device. For example, if a maximum number of allowed write cycles to a sector causes the sector to become unusable, then "1" bits of the identifier may be partially encoded into specific sectors of the flash storage device by writing to the specific sectors for the maximum number of allowed write cycles—W, where W is an integer approximately equal to a percentage of the maximum number of allowed write cycles, such as, for example, 50%, or another value. Thus, all of the specific sectors may be in a usable state, so that the encoded identifier may be hidden. To read the encoded identifier, a number of a write cycles may be performed to the specific sectors. For example, W write cycles may be performed to the specific sectors to make the specific sectors, representing by the "1" bits of the identifier, unusable. In an alternative embodiment, "0" bits of the identifier may be partially encoded into the specific sectors of the flash storage device.

The identifier may have multiple parts. Each of the parts may correspond to a time period. Initially, all parts of the identifier may be hidden (i.e., all of the sectors representing the parts of the identifier may be usable). A part of the identifier may be unveiled by performing write cycles to corresponding specific sectors used to represent the part of the identifier corresponding to a current time. When a next time period is reached, a next part of the identifier may be unveiled by performing write cycles to corresponding specific sectors used to represent the next part of the identifier. If a part of the identifier corresponding to a future time period is unveiled, indicating a possible attack by a hacker, the identifier may be considered invalid.

With respect to the flowchart of FIG. 12, the process may begin with a processing device, such as, for example, processing device 102, accessing license information (act 1202). The license information may be stored on a component of the processing device, such as, for example, a memory, ROM, or other component. Alternatively, the license information and may be stored in the flash storage device, such as, for example, license information 304. The license information may include data identifying a product including the software application, an identifier (for example, an identifier associated with a license to use the product), and a time during which the license is valid. The identifier may include multiple parts, one for each time period making up a total time that the license is valid. In some embodiments, the license information may include a digital signature, signed by a private key, such as, for example, a private key of a trusted source, such as, for example, a software distributor, a software developer, or other trusted source.

Next, the processing device may validate the license information (act 1204). In some embodiments, the processing device may validate license information by using a public key corresponding to the private key of the trusted source. The processing device may then determine whether the license information is valid, as indicated by a result of the validating of the license information (act 1206). If the license information is determined to be invalid, then the processing device may limit or disable functionality of the software application (act 1208). For example, the processing device may not be permitted to execute the software application, or the processing device may execute the software application with a limited functionality. In one embodiment, when the functionality of the software application is limited, the processing device may execute a standard version of the software application, and when the functionality of the software application is not limited or disabled, the processing device may execute an enhanced, or professional, version of the software application.

If, during act 1206, the processing device determines that the license information is valid, the processing device may obtain an identifier from the license information, or another source (act 1210). In some embodiments, the identifier may be a unique identifier. The processing device may then determine whether the identifier is encoded within the flash storage device (act 1212). The processing device may make this determination by referring to a sector array for the identifier, such as, for example sector array for identifier 402 (FIG. 4).

FIG. 13 illustrates exemplary processing with respect to act 1212 in one embodiment. First, the processing device may determine whether a new time period is starting (act 1302). If the new time period is starting, then the processing device may determine whether there are additional portions of the identifier (act 1304). If there are no additional portions of the identifier, then the processing device may indicate that the identifier is not encoded (act 1316). This may indicate that an attempt is made to execute the software application beyond a time period during which authorization for executing the application is permitted. Otherwise, the processing device may determine specific sectors for a next portion of the identifier, corresponding to a next time period (acts 1306). The specific sectors for the next portion of the identifier may be determined by referring to a sector array, such as, for example, sector array for identifier 402, in some embodiments. The processing device may then perform a number of write cycles to the specific sectors representing either "1" bits of the next portion (now, a current portion) of the identifier, or "0" bits of the next portion of the identifier (act 1308). The number of write cycles may be less than the maximum number of allowed write cycles, but greater than (maximum number of allowed to write cycles—W), where W is an integer value. After performing act 1308, the next portion of the identifier may be unveiled by unusable ones of the specific sectors.

If, during act 1302, the processing device determines that a new time period is not starting, or, during act 1308, the number of write cycles to the specific sectors have been performed, then the processing device may determine whether the current portion of the identifier is encoded by unusable sectors (act 1310). If the processing device determines that the current portion of the identifier is not encoded, then the processing device may indicate that the identifier is not encoded (act 1316). Otherwise, the processing device may determine whether any portions of the identifier for future time periods are encoded (act 1312). If any of the portions of the identifiers for use during the future time periods are encoded. Encoded portions of the identifier corresponding to future time periods may indicate an attack by a hacker. Therefore, if any of the portions of the identifier, corresponding to any of the future time periods, are encoded, then the processing device may indicate that the identifier is not encoded (act 1316) indicating unauthorized use. If all the portions of the identifier, corresponding to the future time periods, are not encoded, then the processing device may indicate that the identifier is encoded (act 1314) to indicate authorized use.

Returning to FIG. 12, if, during act 1212, the processing device determines that the current portion of the identifier is encoded within the flash storage device, then the processing device may permit a software application to execute with full functionality (act 1214). Otherwise, the processing device may limit or disable functionality of the software application (act 1208).

As an example of the embodiment described with respect to FIGS. 12 and 13, suppose the identifier has 36 parts, 16 bits each, with a total length of 576 bits. Each of the parts of the identifier may correspond to one month of application usage. As a result, the application may be authorized for 36 months of use. Further, suppose that one million write cycles makes a sector of flash storage unusable. When the application is first started and activated, the application may unveil a first 16-bit portion of the identifier by performing a number of writes to specific sectors corresponding to either "1" bits or "0" bits of the first 16-bit portion of the identifier, as described with respect to act 1310. The application may validate that the first 16-bit portion of the identifier matches a corresponding 16-bit portion of the identifier included in license information. If the application determines that a 16-bit portion corresponding to one of a number of future months is unveiled, the application may be disabled or may execute with limited functionality. After one month, the application may unveil a next 16-bit portion of the identifier and may validate that the next 16-bit portion of the identifier matches a corresponding 16-bit portion of the identifier included in the license information.

Figure 14:
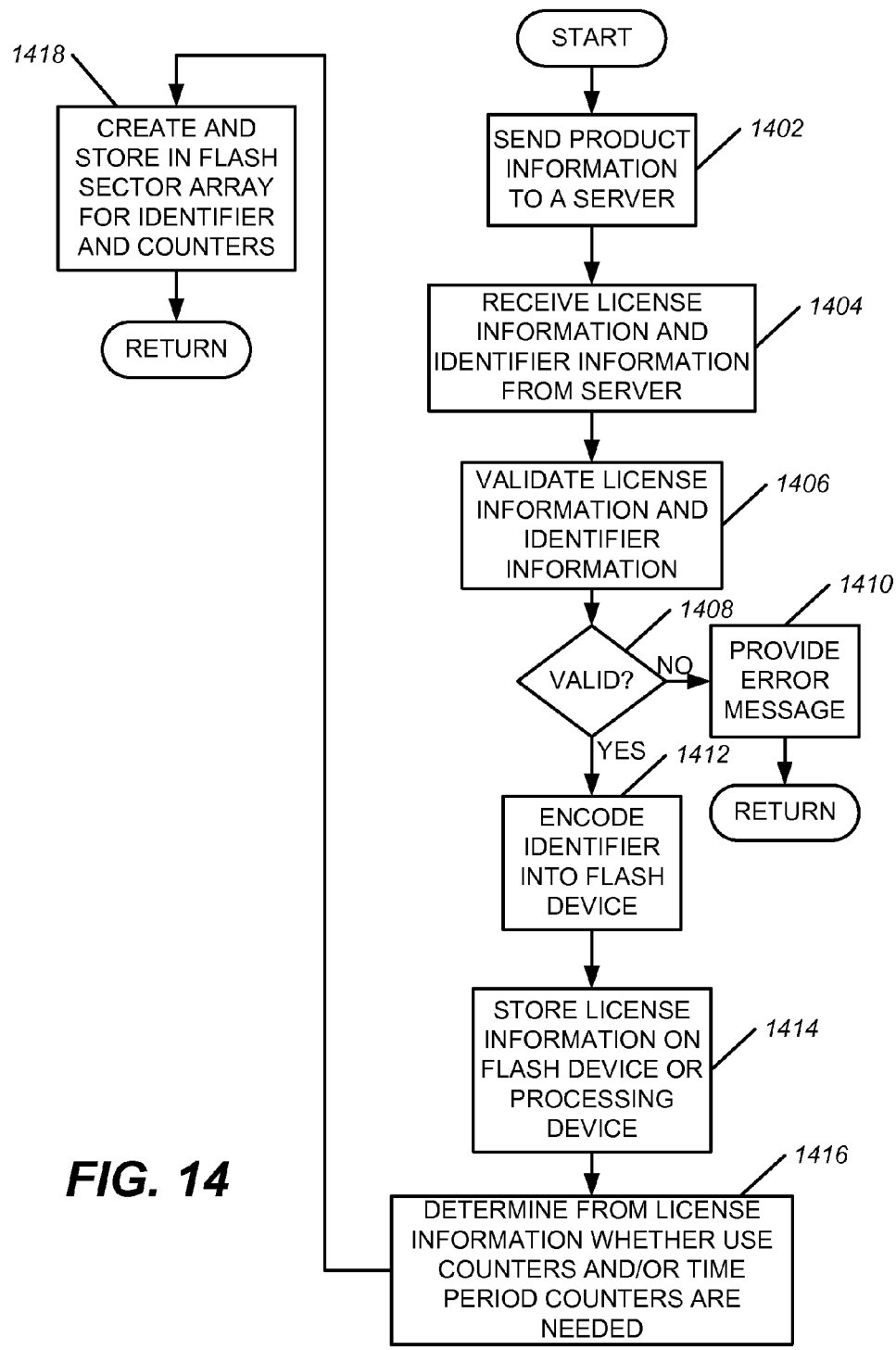

In some embodiments consistent with the subject matter of this disclosure, a flash storage device may be encoded for use with the software application, as previously described, via a user's processing device, such as, for example, processing device 102. FIG. 14 illustrates an exemplary process which may be performed in such embodiments. The process may be part of an activation process to activate or enable execution of the software application.

The process may begin with the processing device sending product information to a second processing device, such as, for example, server 106 (act 1402). The product information may include information identifying a product including the software application. The processing device may receive, from the second processing device in response to the sending of the product information, license information and identifier information (act 1404). In some embodiments, the license information may include the identifier and information with respect to one or more terms of a license. The license information may further be digitally signed using a private key of a trusted source. In some embodiments, the identifier may have a separate digital signature using the private key of the trusted source.

The processing device may then validate the license information and identifier information (act 1406). In some embodiments, the processing device may validate the license information and identifier information using a public key corresponding to the private key of the trusted source. The processing device may, based on a result of the validation, determine whether the license information and the identifier information are valid (act 1408). If the license information and the identifier information are determined not to be valid, the processing device may provide an error message to the user (act 1410). Otherwise, the processing device may encode the identifier and the corresponding digital signature into the flash storage device connected to the processing device (act 1412). The processing device may perform the encoding by writing to specific sectors of the flash storage to make the specific sectors unusable, or, as described above, the specific sectors may remain usable, but the encoding may be unveiled later by performing a number of write cycles to the specific sectors to make them unusable. For example, the identifier and the digital signature may be encoded by representing one bits via unusable sectors and representing zero bits via usable sectors. In some embodiments, the information may be encoded by representing zero bits via unusable sectors and representing one bits via usable sectors. The license information may be stored either on the flash storage device or on the processing device (act 1414).

Next, the processing device may determine from the license information whether use counters and/or time period counters are to be used (act 1416). For example, if the license information indicates that the software application may be executed a predetermined number of times, then use counters may be used. If the license information indicates that authorization to execute the software application expires after a specific time period or expiration date, then time period counters may be used.

The processing device may then create one or more sector arrays with respect to the identifier and counters, and may further store information with respect to a number of writes to perform to a sector, a length of a time period (day, week, year, etc.) with respect to a clock, such as a system clock or other time measuring tool, or other information (act 1418).

CONCLUSION

Use of generic flash storage devices to prevent unauthorized use of software is less expensive than a method requiring a special device, such as, a USB dongle or memory key. Further, a method for using a user-supplied flash storage device to prevent unauthorized use of software makes delivery of a specialized device with the software unnecessary and is a practical method for protecting electronically distributed software from unauthorized use.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Additionally, in some embodiments, a software application may be stored within a flash storage device, while in other embodiments, the software application maybe stored on a component of a processing device, such as a ROM, a hard disk, or another component. Accordingly, the appended claims and their legal equivalents should only define the invention, rather than any specific examples given.

I claim as my invention:

1. A machine-implemented method of employing a flash storage device in selectively controlling use of software, the machine-implemented method comprising:
   accessing license information encoded in the flash storage device, wherein usability or non-usability of respective sectors of a plurality of sectors of the flash storage device corresponds to values of a plurality of data bits of at least a portion of the license information;
   selectively controlling the use of the software based at least in part on the accessed license information; and
   in response to selectively controlling the use of the software, rendering at least one sector in which the license information is encoded non-usable, including:
      performing a plurality of write operations to the at least one sector.

2. The machine-implemented method of claim 1, wherein accessing the license information includes:
   reading the portion of the license information from the flash storage device by determining the usability or non-usability of each of multiple sectors of the plurality of sectors, the determining the usability or non-usability of each of multiple sectors of the plurality of sectors comprising performing at least one write operation to each of the multiple sectors.

3. The machine-implemented method of claim 1, wherein:
   the license information is associated with a number of times that the software is licensed to be used,
   rendering the at least one sector in which the license information is encoded non-usable also includes:
      rendering a particular use counting sector of a plurality of use counting sectors non-usable, and wherein
   selectively controlling the use of the software includes:
      determining whether any use counting sector of the plurality of use counting sectors is usable; and
      selectively controlling the use of the software based at least in part on the determination of whether any use counting sector of the plurality of use counting sectors is usable.

4. The machine-implemented method of claim 1, wherein:
   the license information is associated with a validity period for the software,
   rendering the at least one sector in which the license information is encoded non-usable also includes:
      rendering the at least one sector in which the license information is encoded non-usable in response to a determination that the validity period has ended, and wherein
   selectively controlling the use of the software includes:
      determining whether the at least one sector is usable; and
      selectively controlling the use of the software based at least in part on the determination of whether the at least one sector is usable.

5. The machine-implemented method of claim 1, wherein the portion of the license information includes at least an identifier of the software and a representation of at least one license term for the software.

6. The machine-implemented method of claim 1, wherein the machine-implemented method further comprises:
   performing a network-based validation of the accessed license information.

7. The machine-implemented method of claim 1, wherein the machine-implemented method further comprises:
   encoding the identifier into specific sectors of the plurality of sectors as part of an activation of the software.

8. The machine-implemented method of claim 1, wherein the license information includes a digital signature of an identifier of the software.

9. The machine-implemented method of claim 1, wherein a usable sector of the plurality of sectors represents a value of "one" for a particular data bit of the plurality of data bits and a non-usable sector of the plurality of sectors represents a value of "zero" for another data bit of the plurality of data bits.

10. The machine-implemented method of claim 1, wherein a usable sector of the plurality of sectors represents a value of "zero" for a particular data bit of the plurality of data bits and a non-usable sector of the plurality of sectors represents a value of "one" for another data bit of the plurality of data bits.

11. A computer-readable storage medium, comprising at least one of a memory, disk, or device, having instructions stored therein for performing operations that selectively control use of software, the operations comprising:
   accessing license information encoded in a flash storage device according to respective usability or non-usability of each sector of a plurality of sectors of the flash storage device, wherein each sector of the plurality of sectors corresponds to a particular data bit of a plurality data bits of at least a portion of the license information, the accessing license information comprising:
      reading the portion of the license information from the flash storage device by determining the usability or non-usability of each of multiple sectors of the plurality of sectors,
      the determining the usability or non-usability of each of multiple sectors of the plurality of sectors comprising performing at least one write operation to each of the multiple sectors; and
   selectively controlling the use of the software based at least in part on the accessed license information.

12. The computer-readable storage medium of claim 11, wherein the operations further comprise:
   in response to selectively controlling the use of the software, rendering at least one sector in which the license information is encoded non-usable, including:
      performing a plurality of write operations to the at least one sector.

13. The computer-readable storage medium of claim 12, wherein:
   the license information is associated with a number of times the software is licensed for execution, rendering the at least one sector in which the license information is encoded non-usable also includes: rendering a particular use counting sector of a plurality of use counting sectors non-usable, and wherein
selectively controlling the use of the software includes:
determining whether any use counting sector of a plurality of use counting sectors is usable; and
selectively controlling the use of the software based at least in part on the determination of whether any use counting sector of a plurality of use counting sectors is usable.

14. The computer-readable storage medium of claim 11, wherein the portion of the license information includes at least an identifier of the software and represents at least one license term for the software.

15. The computer-readable storage medium of claim 11, wherein the software is stored on the flash storage device.

16. A computing device, comprising:
at least one memory and at least one processor that are respectively configured to store and execute instructions, including instructions for performing operations to selectively control use of software, the operations comprising:
accessing license information encoded in a flash storage device according to respective usability or non-usability of each sector of a plurality of sectors of the flash storage device, wherein each sector of the plurality of sectors corresponds to a particular data bit of a plurality of data bits of at least a portion of the license information;
determining whether to allow or disallow the use of the software based at least in part on the accessed license information; and
in response to a determination regarding whether to allow or disallow the use of the software, rendering at least one sector in which the license information is encoded non-usable by performing a plurality of write operations to the at least one sector.

17. The computing device of claim 16, wherein accessing the license information includes:
reading the portion of the license information from the flash storage device via a plurality of write operations to each of multiple sectors of the plurality of sectors.

18. The computing device of claim 16, wherein:
the license information is associated with a number of times the software is licensed for execution,
rendering the at least one sector in which the license information is encoded non-usable includes:
rendering a particular use counting sector of a plurality of use counting sectors non-usable, and wherein
determining whether to allow or disallow the use of the software includes:
determining whether any use counting sector of the plurality of use counting sectors is usable; and
determining whether to allow or disallow the use of the software based at least in part on the determination of whether any use counting sector of the plurality of use counting sectors is usable.

19. The computing device of claim 16, wherein:
the license information is associated with a validity period for the software,
rendering the at least one sector in which the license information is encoded non-usable also includes:
rendering the at least one sector in which the license information is encoded non-usable in response to a determination that the validity period has ended, and wherein
determining whether to allow or disallow the use of the software includes:
determining whether the at least one sector is usable; and
selectively controlling the use of the software based at least in part on the determination of whether the at least one sector is usable.

20. The computing device of claim 16, wherein the software is stored on the flash storage device.

* * * * *